(12) United States Patent
Miller et al.

(10) Patent No.: US 7,944,106 B2
(45) Date of Patent: May 17, 2011

(54) APPARATUS FOR COOLING AND LUBRICATING AN OFF-AXIS MOTOR/GENERATOR IN A TRANSMISSION HAVING TWO MOTOR/GENERATORS

(75) Inventors: Kent A. Miller, Pinckney, MI (US); Henryk Sowul, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/701,866

(22) Filed: Feb. 8, 2010

(65) Prior Publication Data
US 2010/0132504 A1 Jun. 3, 2010

Related U.S. Application Data

(62) Division of application No. 11/561,115, filed on Nov. 17, 2006, now abandoned.

(51) Int. Cl.
*H02K 16/00* (2006.01)
(52) U.S. Cl. .......................................... 310/112; 310/90
(58) Field of Classification Search .................. 310/112, 310/114, 89, 90, 83, 75 R; 903/906, 951; 180/65.21, 65.22; 475/1–10, 159, 160; 477/2–29; 74/606 A; *H02K 16/00, 16/02, 16/04*
See application file for complete search history.

(56) References Cited

U.S. PATENT DOCUMENTS

| | | | | |
|---|---|---|---|---|
| 5,034,638 A | * | 7/1991 | McCabria | 310/54 |
| 5,558,589 A | * | 9/1996 | Schmidt | 475/5 |
| 5,875,691 A | | 3/1999 | Hata et al. | |
| 6,579,202 B2 | | 6/2003 | El-Antably et al. | |
| 6,881,168 B2 | * | 4/2005 | Bowen | 475/5 |
| 6,896,080 B2 | * | 5/2005 | Takenaka | 180/65.235 |
| 7,002,267 B2 | * | 2/2006 | Raszkowski et al. | 310/54 |
| 7,033,296 B2 | * | 4/2006 | Takenaka | 475/5 |
| 7,239,055 B2 | | 7/2007 | Burgman et al. | |
| 2004/0121870 A1 | * | 6/2004 | Takenaka et al. | 475/5 |
| 2006/0287150 A1 | * | 12/2006 | Kim et al. | 475/5 |

FOREIGN PATENT DOCUMENTS

| | | |
|---|---|---|
| DE | 60106376 | 2/2006 |
| DE | 102005035185 | 3/2006 |
| JP | 07076229 | 3/1995 |

* cited by examiner

*Primary Examiner* — Quyen Leung
*Assistant Examiner* — Naishadh N Desai
(74) *Attorney, Agent, or Firm* — Quinn Law Group, PLLC

(57) ABSTRACT

The present invention provides a hybrid transmission with two motor/generators, one being "on-axis" and sharing an axis of rotation with an input and output shaft of the transmission, and another being "off-axis" with a distinct axis of rotation from that of the first motor/generator. The transmission is adapted for cooling and lubricating the off-axis motor/generator, and includes a case at least partially defining a manifold. A transmission cover is mounted to the case such that the off-axis motor/generator is retained therebetween. The transmission cover at least partially defines an oil passage. The manifold is adapted to transfer oil onto a bearing device so that the bearing device is lubricated. Oil is also transferred through the oil passage and onto a torque transfer device such that the torque transfer device is lubricated.

9 Claims, 2 Drawing Sheets

APPARATUS FOR COOLING AND LUBRICATING AN OFF-AXIS MOTOR/GENERATOR IN A TRANSMISSION HAVING TWO MOTOR/GENERATORS

CROSS-REFERENCE TO RELATED APPLICATIONS

This application is a divisional application of U.S. patent application Ser. No. 11/561,115, filed Nov. 17, 2006, which is hereby incorporated by reference in its entirety.

TECHNICAL FIELD

The present invention pertains to an apparatus for cooling and lubricating an off-axis motor/generator of a hybrid transmission having two motor/generators.

BACKGROUND OF THE INVENTION

A conventional electrically variable transmission (EVT) includes two electric machines such as electric motor/generators which are located on the transmission input axis. It may be desirable to relocate one of the electric machines to an off-axis position, particularly in the case of strong hybrid power trains having large electric machines. Electric machines such as electric motor/generators require cooling and lubrication in order to maintain optimal performance.

SUMMARY OF THE INVENTION

A hybrid transmission includes an input shaft and an output shaft which together define a first axis of rotation, a transmission case at least partially defining a manifold, and a transmission cover mounted to the transmission case. The transmission cover at least partially defines an oil passage. The transmission further includes a first and a second motor/generator. The first motor/generator is at least partially enclosed by the transmission case, and is referred to herein as an "on-axis" motor/generator, i.e., the term "on-axis" refers to a first rotor of the first motor/generator sharing the first axis of rotation with the input and output shafts. The second motor/generator, also referred to as the "off-axis" motor/generator, has a second axis of rotation that is distinct from the first axis of rotation. The second motor/generator is at least partially enclosed by the transmission case, and is disposed between the transmission case and the transmission cover.

The second motor/generator includes a generally cylindrical second stator disposed within a stator housing, with the second stator circumscribing the second rotor; a tube disposed along the central axis of the second rotor; a rotor drum mounted to the second rotor and a rotor hub mounted to the rotor drum; and a first bearing configured to rotatably support the rotor drum. Oil is transferable through the manifold to lubricate the first bearing. A second bearing is configured to rotatably support the rotor hub, wherein oil is transferable through the manifold, and through the hollow tube in order to lubricate the second bearing. A torque transfer device is coupled to the rotor hub such that output from the second motor/generator can be transferred to the output shaft. Oil is transferable through the manifold, through the tube, and through the oil passage in order to lubricate the torque transfer device.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
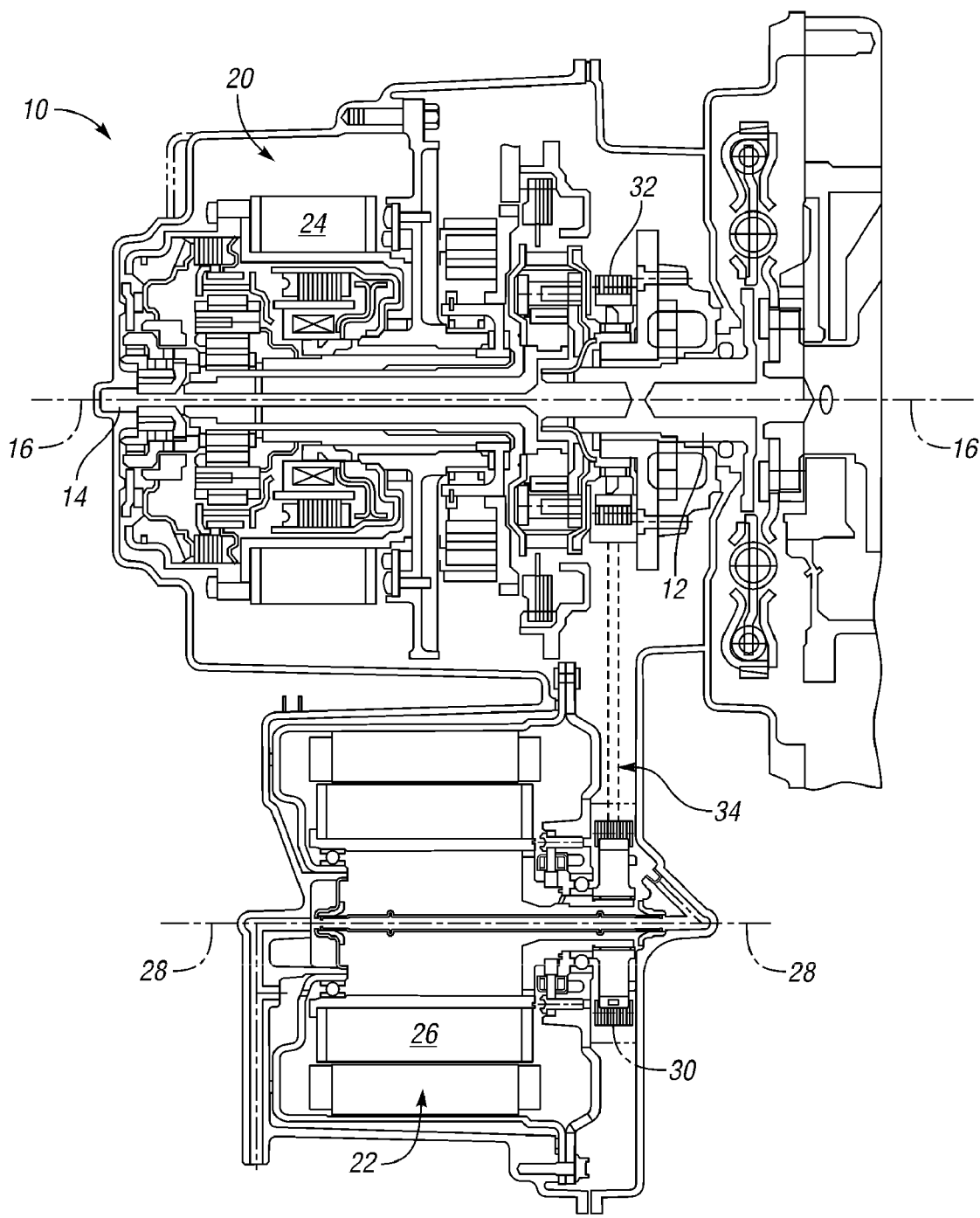
FIG. 1 is a schematic sectional illustration of a hybrid transmission in accordance with the present invention.

Referring to the drawings, wherein like reference numbers correspond to like or similar components throughout the several figures, there is shown in FIG. 1 a schematic sectional illustration of a hybrid transmission 10. The hybrid transmission 10 includes an input shaft 12 and an output shaft 14 which define a first axis of rotation 16. The hybrid transmission 10 also includes first and second electric machines which will hereinafter be described as first and second motor/generators 20, 22 in accordance with the preferred embodiment. The first motor/generator 20 is referred to as an "on-axis" motor/generator because its rotor 24 defines an axis of rotation that shared by or is common with the first axis 16. Similarly, the second motor/generator 22 is referred to as an "off-axis" motor/generator because its rotor 26 defines an axis of rotation that is distinct from the first axis 16.

A first sprocket 30 coupled to the rotor 26 is rotatable about a second axis of rotation 28, and second sprocket 32 is rotatable about the first axis 16. A chain 34 couples the sprockets 30 and 32 such that output from the off-axis motor/generator 22 is transferable from the second axis 28 to the first axis 16 in order to drive the transmission output shaft 14. Although the present invention is described as incorporating a plurality of sprockets 30, 32 coupled by a chain 34, other known torque transfer devices such as, for example, a transfer gear arrangement (not shown) may also be implemented to transfer torque from the off-axis motor/generator 22 to the transmission output shaft 14.

Figure 2:
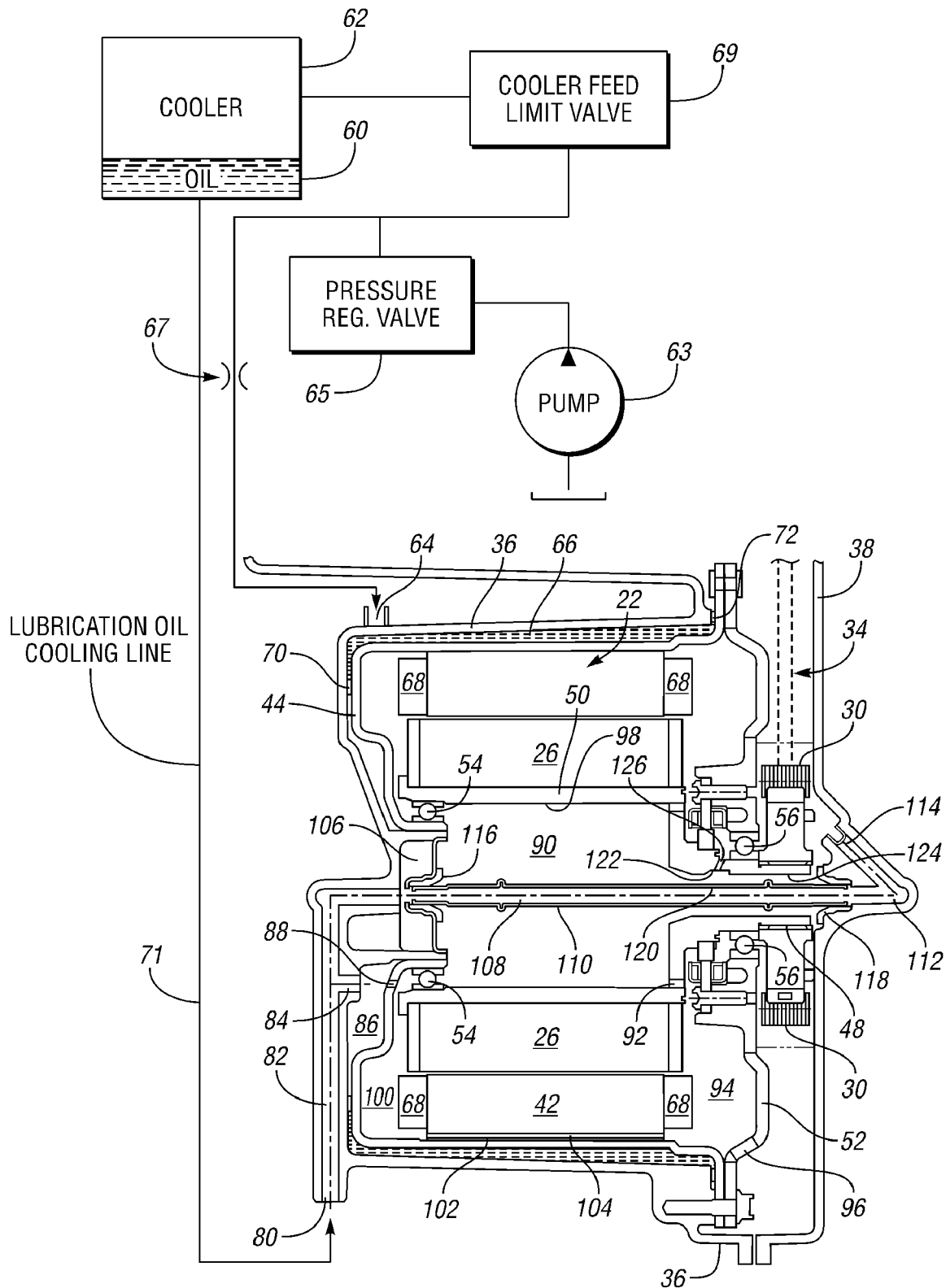
FIG. 2 is a more detailed schematic sectional illustration of an off-axis motor/generator of the hybrid transmission of FIG. 1.

Referring to FIG. 2, a schematic sectional illustration of the off-axis motor/generator 22 is shown in more detail. The off-axis motor/generator 22 is retained within and secured to a transmission case 36. A transmission cover 38 is mounted to the transmission case 36 such that the off-axis motor/generator 22 is disposed therebetween.

The off-axis motor/generator 22 includes a stator 42, a stator housing 44, the rotor 26, a rotor hub 48, and a rotor drum 50. The stator 42 is substantially annular and is configured to remain stationary relative to the stator housing 44 during operation of the motor/generator 22. The rotor 26 is generally circumscribed by the stator 42 and is rotatable relative thereto. The rotor drum 50 is secured to a radially inner portion of the rotor 26 for unitary rotation therewith. The rotor hub 48 and rotor drum 50 may be a single piece construction as shown in accordance with the preferred embodiment or may include individual rigidly connected components. A motor cover 52 is mounted to the stator housing 44 such that the stator 42 and rotor 26 are disposed therebetween. A left side bearing 54 is adapted to rotatably support the rotor drum 50 on the stator housing 44, and a right side bearing 56 is adapted to rotatably support the rotor hub 48 on the motor cover 52.

The present invention implements a fluid such as oil 60 to cool the off-axis motor/generator 22. A pump 63 provides the cooling oil 60 to the chamber 66 through the pressure regulator valve 65, orifice 67 and inlet 64. The pump 63 provides lubrication oil to inlet 80 through the cooler feed limit valve 69, cooler 62 and cooling line 71.

The coolant chamber 66 is defined between the stator housing 44 and the transmission case 36. A first seal 70 is disposed near one axial end portion of the stator 42 between the stator housing 44 and the transmission case 36 to seal one end of the coolant chamber 66, and a second seal 72 is disposed near the other axial end of the stator 42 between the stator housing 44 and the transmission case 36 to seal the other end of the coolant chamber 66. It is well known that the stator coils 68 are a primary source of heat during the operation of the off-axis motor/generator 22. The proximity of the coolant chamber 66 to the stator 42 and the stator coils 68 facilitates the cooling of the motor/generator 22. Accordingly, by circulating cool oil 60 from the cooler 62 through the coolant chamber 66, the off-axis motor/generator 22 can be cooled such that efficiency and durability are improved.

The present invention also implements the oil 60 to lubricate the off-axis motor/generator 22. More precisely, the oil 60 is implemented to lubricate motor/generator components including the left side bearing 54, the chain 34, and the right side bearing 56 as will individually be described in detail hereinafter.

The left side bearing 54 is preferably lubricated in the following manner. The pump 63 transfers oil 60 from the cooler 62 into the lubrication inlet 80. Thereafter, the oil 60 is transferred from the lubrication inlet 80, through a manifold 82, through an oil passage 84, and into a chamber 86. The manifold 82 and oil passage 84 are preferably integrally defined in a wall of the transmission case 36 such as with a casting process and/or a machining process. The chamber 86 is defined between the transmission case 36 and the stator housing 44. The oil 60 is transferred from the chamber 86, through one or more orifices 88 and onto the left side bearing 54 such that the left side bearing 54 is lubricated. The orifices 88 are defined by the stator housing 44 and are preferably formed with a machining process. The size and quantity of orifices 88 may be varied to control the rate at which oil 60 is transferred onto the left side bearing 54.

After lubricating the left side bearing 54, the excess oil 60 is transferred into a drum cavity 90 defined by the rotor drum 50, through one or more exhaust holes 92 and into the chamber 94. The exhaust holes 92 are defined by the rotor drum 50, and the chamber 94 is defined between an end portion of the stator 42 and the motor cover 52. The oil 60 is then transferred from the chamber 94 through a motor vent 96 defined by the motor cover 52 such that the oil 60 may be implemented for other cooling, lubrication and/or pressure requirements of the transmission 10 (shown in FIG. 1). To reduce the amount of oil 60 trapped within the rotor drum 50, the interior surface 98 is preferably conical such that the diameter defined by the interior surface 98 tapers in an axial direction becoming larger toward the exhaust holes 92. It has been observed that an interior surface 98 having a taper angle of approximately 1 degree is sufficient to drive the oil 60 from the left side bearing 54 toward the exhaust holes 92.

Some of the oil 60 used to lubricate the left side bearing 54 is transferred into a chamber 100 as it passes from the orifice 88 onto the left side bearing 54. To prevent excessive accumulation of oil 60 in the chamber 100, the stator 42 includes a radially outer surface 102 defining a plurality of axial channels 104. The axial channels 104 are in fluid communication with both the chamber 100 and the chamber 94. Accordingly, accumulated oil 60 in chamber 100 is transferable through the axial channels 104, into the chamber 94, and out of the motor vent 96.

The chain 34 is preferably lubricated in the following manner. The pump 63 transfers oil 60 from the cooler 62 into the lubrication inlet 80. Thereafter, the oil 60 is transferred from the lubrication inlet 80, through the manifold 82, and into a chamber 106. The oil 60 in the chamber 106 is transferred through a channel 108 defined by a tube 110, into the oil passage 112, through the orifice 114, and onto the chain 34 such that the chain 34 is lubricated. The tube 110 is preferably sealed by first and second seals 116, 118 disposed at axially defined ends thereof. The tube 110 is generally positioned on the central axis of the rotor drum 50 and remains stationary relative to the rotatable rotor drum 50. The oil passage 112 and the orifice 114 are preferably integrally defined in a wall of the transmission cover 38 such as with a machining process. The size of the orifice 114 can be varied to control the rate at which oil 60 is transferred onto the chain 34.

The right side bearing 56 is preferably lubricated in the following manner. The cooler 63 transfers oil 60 into the lubrication inlet 80. Thereafter, the oil 60 is transferred from the lubrication inlet 80, through the manifold 82, and into the chamber 106. The oil 60 in the chamber 106 is transferred through the channel 108 defined by the tube 110, through one or more orifices 120, and is collected in the annulus 122. The orifices 120 are defined by the tube 110. The annulus 122 is formed in a radially inner surface 124 of the rotor hub 48. Centrifugal forces generated during the rotation of the rotor hub 48 assist in the transfer of the oil 60 collected in the annulus 122 through an angled hole 126 and onto the right side bearing 56 such that the right side bearing 56 is lubricated. The angled hole 126 is defined by the rotor hub 48 such as with a machining process. After lubricating the right side bearing 56, part of the oil 60 is exhausted into the motor chamber 94 and through the motor vent 96, and the other part of the oil leaving the bearing 56 lubricates the chain 34 (shown in FIG. 1).

While the best modes for carrying out the invention have been described in detail, those familiar with the art to which this invention relates will recognize various alternative designs and embodiments for practicing the invention within the scope of the appended claims.

The invention claimed is:

1. A hybrid transmission comprising:
    an input shaft and an output shaft which together define a first axis of rotation;
    a transmission case at least partially defining a manifold;
    a transmission cover mounted to the transmission case, the transmission cover at least partially defining an oil passage;
    a first motor/generator at least partially enclosed by the transmission case, and having a first rotor sharing the first axis of rotation;
    a second motor/generator at least partially enclosed by the transmission case, and having a second rotor with a second axis of rotation that is distinct from the first axis of rotation, wherein the second motor/generator is disposed between the transmission case and the transmission cover, the second motor/generator comprising:
        a generally cylindrical stator disposed within a stator housing, the stator circumscribing the second rotor;
        a tube disposed along the central axis of the second rotor;
        a rotor drum mounted to the second rotor;
        a rotor hub mounted to the rotor drum;

a first bearing configured to rotatably support the rotor drum, wherein oil is transferable through the manifold in order to lubricate the first bearing;

a second bearing configured to rotatably support the rotor hub, wherein oil is transferable through the manifold, and through the tube in order to lubricate the second bearing; and a torque transfer device coupled to the rotor hub such that output from the second motor/generator can be transferred to the output shaft, wherein oil is transferable through the manifold, through the tube, and through the oil passage in order to lubricate the torque transfer device.

2. The hybrid transmission of claim 1, further comprising a coolant chamber defined between the transmission case and the stator housing of the second motor/generator, wherein oil is transferable into the coolant chamber to cool the second motor/generator.

3. The hybrid transmission of claim 1, wherein the rotor drum of the second motor/generator defines at least one exhaust hole and a drum cavity adapted to direct the oil toward the at least one exhaust hole, thereby limiting an accumulation of the oil within the rotor drum.

4. The hybrid transmission of claim 1, wherein the torque transfer device is a chain configured to transfer output from the second motor/generator to the output shaft.

5. The hybrid transmission of claim 1, wherein the torque transfer device is a transfer gear.

6. The hybrid transmission of claim 1, further comprising:
a pressure regulator valve;
a cooler feed limit valve;
a cooler in fluid communication with the manifold through the cooler feed limit valve; and
a pump adapted for providing oil to the chamber through the pressure regulator valve, and to the cooler through the cooler feed limit valve.

7. A hybrid transmission having an input shaft and an output shaft defining a first axis of rotation, the transmission comprising:

an on-axis motor/generator having a first rotor that shares the first axis of rotation with the input shaft and the output shaft;

an off-axis motor/generator unit having a second rotor that defines a second axis of rotation that is distinct from the first axis of rotation;

a case at least partially defining a manifold, wherein the second motor/generator is retained within and secured to the case, a transmission cover mounted to the transmission case, such that the second motor/generator is retained between the transmission case and the transmission cover, the transmission cover at least partially defining an oil passage;

a torque transfer device;

a tube disposed along the central axis of the second rotor, and adapted for transferring oil through the oil passage and onto the torque transfer device; and a bearing device;

wherein the manifold is adapted for transferring oil onto the bearing device such that the bearing device is lubricated, and wherein the oil passage is adapted to transfer oil onto the torque transfer device such that the torque transfer device is lubricated.

8. The hybrid transmission of claim 7, further comprising:
a pressure regulator valve;
a cooler feed limit valve;
a cooler in fluid communication with the manifold through the cooler feed limit valve; and
a pump adapted for providing oil to the chamber through the pressure regulator valve and to the cooler through the cooler feed limit valve.

9. The hybrid transmission of claim 7, wherein the first bearing device is adapted to rotatably support a rotor drum, and wherein the second bearing device is adapted to rotatably support a rotor hub.

* * * * *